USO05856872A

United States Patent [19]
Horwitz

[11] Patent Number: 5,856,872
[45] Date of Patent: Jan. 5, 1999

[54] VERNIER INDEX POSITION SENSOR

[75] Inventor: Bruce A. Horwitz, Newton Centre, Mass.

[73] Assignee: MicroE, Inc., Natick, Mass.

[21] Appl. No.: 943,004

[22] Filed: Oct. 2, 1997

[51] Int. Cl.⁶ ............................................ G01B 9/02
[52] U.S. Cl. ............................. 356/356; 250/231.17
[58] Field of Search ...................... 356/356; 250/237 G, 250/231.14, 231.16, 231.17

[56] References Cited

U.S. PATENT DOCUMENTS 4,266,125  5/1981  Epstein et al. .................... 250/231.17
5,486,923  1/1996  Mitchell et al. ........................ 356/356

*Primary Examiner*—Samuel A. Turner
*Attorney, Agent, or Firm*—Limbach & Limbach L.L.P.

[57] ABSTRACT

An index structure and method are disclosed which employ, in addition to a main diffractive grating track of an encoder, a short diffractive grating track (the vernier or index track) having a different frequency than that of the main track. The phase of the index track is used to provide windows for the main track in a manner so that a preselected phase condition of the main track occurs in only one of the windows provided by the index track.

23 Claims, 5 Drawing Sheets

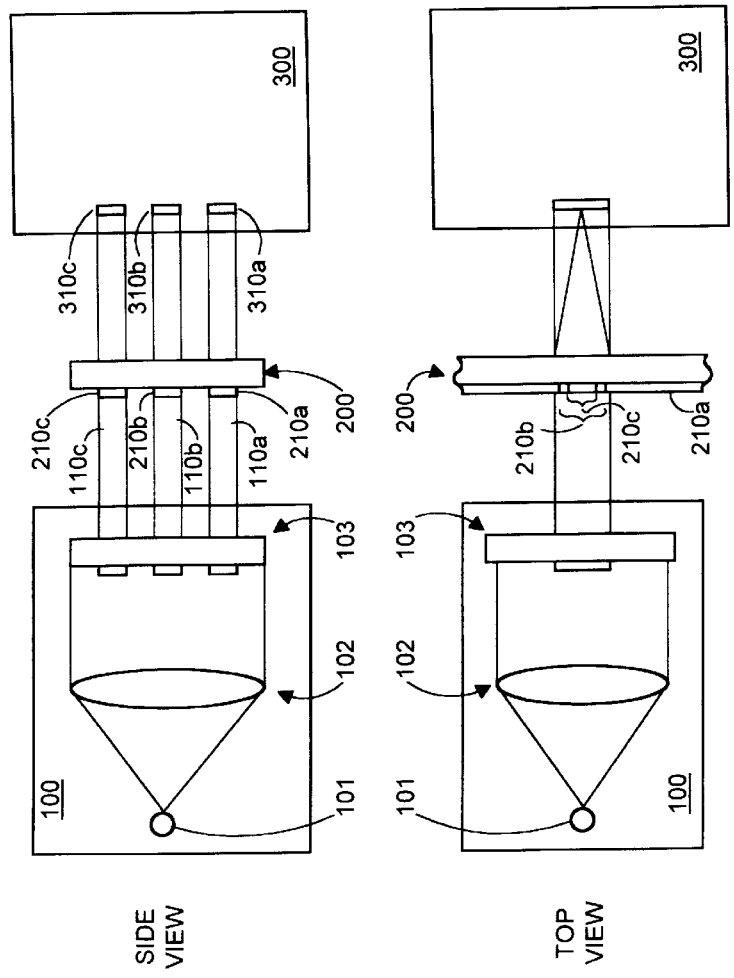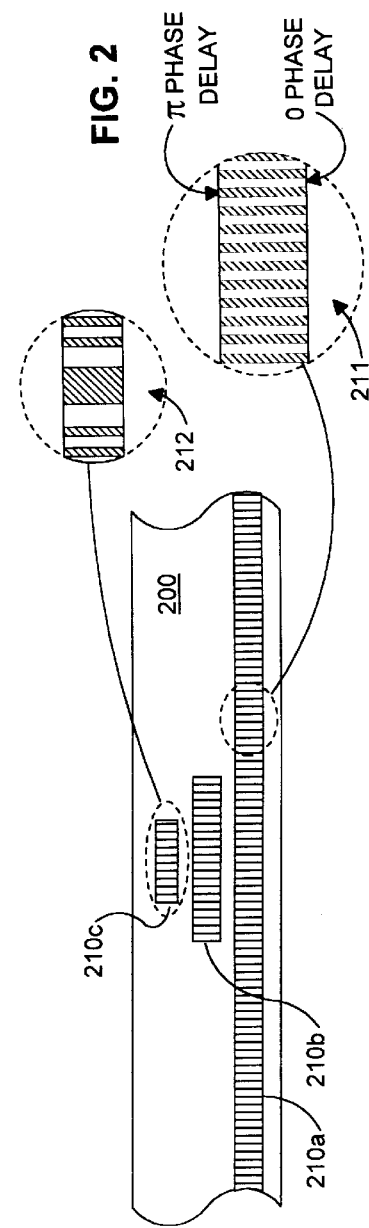

VERNIER INDEX POSITION SENSOR

TECHNICAL FIELD

The present invention is directed generally to index marks for position sensors, and more particularly to an apparatus and method for creating a diffractive index mark in a optical position sensor of the type which operates in a region of interference between diffractive orders of light produced by diffractive structures.

BACKGROUND ART

In a position encoder, an index mark is used to identify a fixed location within the encoder's position range. This index can be used to reset or initialize an incremental encoder's up/down counter, for example. In prior position sensors, index marks have been provided by image-plane tick marks or, as in position sensors designed by the assignee of the subject application, binary optic lenses. The difficulty with the former is that the sensing optics for the diffracted fringes and the image-plane tick marks are inherently different, making the system more complex and harder to align and tolerance. The difficulty with the latter is its limited resolution and reduced alignment tolerances.

SUMMARY OF THE INVENTION

These and other problems and disadvantages of prior indexing schemes are overcome by the present invention of an index structure and method which employs, in addition to a main diffractive grating track of an encoder, a short diffractive grating track (the vernier or index track) that is used to provide windows for the main track in a manner so that a preselected phase condition of the main track occurs in only one of the windows provided by the index track.

In the preferred embodiment of the present invention a cylindrical, binary optic lens is also employed next to the index track to provide a coarse gating signal. A three-channel detector is also used. The three-channel detector has three parallel linear arrays, two of which operate as N-bin sensors, the third of which acts like a "tri-cell".

The vernier or index track grating is preferably at a slightly different frequency than the main track, so the index fringes change phase with grating position at a slightly different rate from the main track. Each track's fringes are sensed by only one of the detector channels. The phase of the index track is used as a window for the main track such that one and only one zero phase crossing of the main track occurs in all the windows, thus defining an index. The binary optic lens on the grating serves as a gate to inhibit false windows due to noise in the vernier detectors.

Although the present invention is a means and method of creating a diffractive index mark particularly suited for optical position sensors of the type disclosed in U.S. Pat. No. 5,646,730, assigned to the assignee of the present application, it could also be applied to other types of encoders that can have multiple periodic information "tracks".

These and other advantages and details of the present invention will be more readily understood upon consideration of the following drawings and detailed description of the present invention.

BRIEF DESCRIPTION OF THE DRAWINGS

FIGS. 1A and 1B are a simplified functional diagram of the side and top views, respectively, of source, grating and detector modules in accordance with the present invention.

FIG. 2 is a simplified illustration of the separate tracks of the grating in accordance with the present invention.

DETAILED DESCRIPTION OF THE INVENTION

Figure 3:
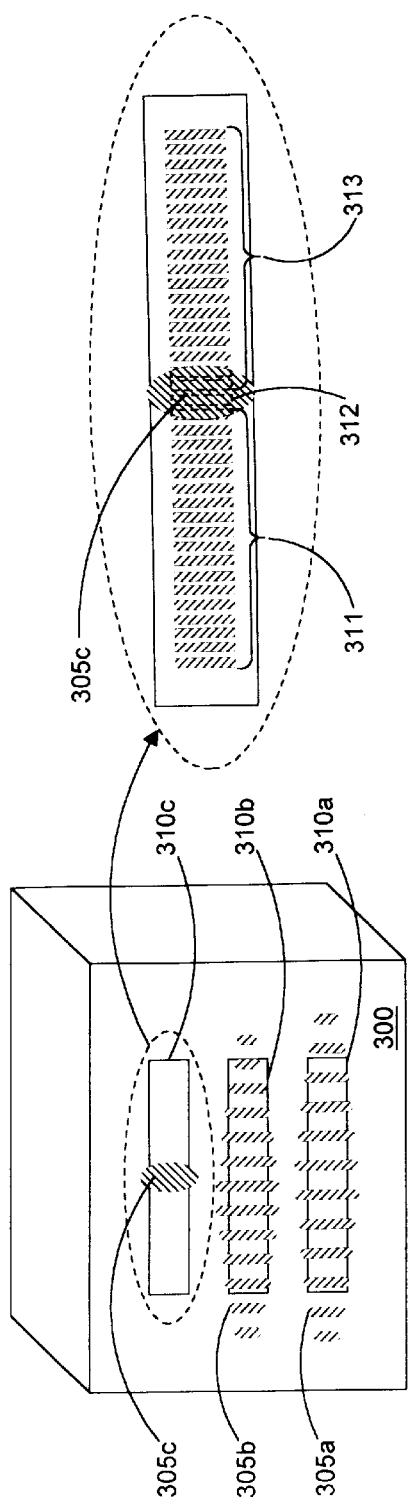
FIG. 3 illustrates the fringe patterns produced by the gratings on the detector arrays of the detector module.

In accordance with the present invention, a short section of an incremental encoder is employed to create a vernier signal. The portion of the incremental encoder that is being used for the index (vernier) is identified by a gating signal, within which the index point is identified by the coincidence of a particular phase from the vernier and main tracks simultaneously. For example, the index point could be declared to be where each track has zero phase.

The gate pulse is employed to ensure that noise signals in the vernier track detector (during the time the vernier track is not fully within the field of illumination) do not accidentally look like the appropriate index phase. In addition, the gate pulse is used to isolate a single repeat of the otherwise periodic vernier-to-main track beat. The strength of the signal from the vernier track is less desirable as the gate, since by its very nature it is a signal that slowly gains strength during the transition from having no vernier grating in the field of view to having the vernier grating fully filling the field of view. The transition region is typically longer than the repeat length of the vernier/main beat frequency.

The gate pulse is generated using a third detector array in the form of two overlapping, virtual bi-cells (also called a tri-cell). The gate track on the grating generates a spot of light which moves by these bi-cells, triggering the start and end of the gate pulse.

Referring to FIG. 1, the preferred embodiment of the present invention includes a source module 100, a three-track grating 200, and a detector/processor module 300. The source module 100 includes a source of quasi-monochromatic, spatially coherent light 101, typically a diode laser, a collimator 102, and, depending on the application and following U.S. Pat. No. 5,646,730, one or two wavefront compensators 103. U.S. Pat. No. 5,646,730 is hereby incorporated by reference in its entirety.

Source module 100 produces three sets of beams 110a, 110b, and 110c, which are projected to the three-track grating 200. Typically, two of these sets, 110a and 110b, will have "pre-crank" angles, as described in U.S. Pat. No. 5,646,730, due to the wavefront compensator(s), while the third beam 110c will just be collimated.

The three-track grating 200 can be linear or radial. A linear grating is shown for simplicity. The grating 200 is conventional insofar as it is typically a pure phase grating having, within each diffractive track, alternating regions of zero and pi-phase delay. As shown in FIG. 2, the grating 200 includes three separate tracks. The main track 210a is a square wave function 211 that extends for the entire range of the encoder and provides the basic incremental encoder fringes, as is conventional.

The vernier or index track 210b is placed parallel to the main track 210a. It is also a square wave function but it only needs to extend over a few millimeters of the range—long enough to be completely filled by the illuminating beam (although it can be longer). The vernier track 210b has a slightly different period than main track 210a, but is otherwise identical. The vernier track 210b is located to span the region in which the index mark is desired.

The gate track 210c is parallel to the main track 210a and vernier 210b track, centered at the approximate center of the vernier track 210b, and has a binary optic, cylindrical lens function 212.

The grating 200 is positioned in the three beam sets 110a, 110b, 110c coming from the source module 100 such that there is a one-to-one matching of the beams with the grating tracks (110a, 110b, and 110c to 210a, 210b, and 210c respectively).

The light in each beam set is diffracted and redirected by the grating tracks 210a, 210b, and 210c. After leaving the grating 200, the diffracted beams propagate to the detector/processing module 300. As shown in FIG. 3, when they reach the plane of the detector 300, diffracted orders of the main and vernier track beams interfere to form linear sinusoidal fringes 305a, 305b, respectively. The period of these fringes is determined by the grating track period and the associated wavefront compensator, if any.

The beam from the gate track 210c, when present, is focused to a near diffraction limited spot 305c since the focal length of the binary cylindrical lens is selected to match the grating to detector distance. When the gate track is not present, this beam typically provides a static general illumination of the detector 300.

The detector 300 comprises three sub-arrays, one matching each grating track 210a, 210b, and 210c. Preferably, all of the sub-arrays have identical sensing element structure, with the differences between the sub-arrays being limited to the interconnections and read-out connections for the elements. The main and vernier arrays 310a and 310b, respectively, are interconnected to function as interdigitated "phased array" detectors such as those disclosed in U.S. Pat. No. 5,646,730. The signals from these arrays are processed using a conventional N-bin algorithm, which produces an estimate of the quadrature components of the sinusoidal fringes.

The gate track array 310c is interconnected to function as two overlapping bi-cells (a tri-cell); that is, the array appears as if it has three detecting regions or cells 311, 312, and 313. The signals from the cells 311, 312, and 313 are processed to provide a gate pulse that is an indication of when a spot of light is in the central cell 312.

Reference is made to U.S. Pat. No. 5,646,730, which is a continuation of U.S. patent application Ser. No. 08/394,224, filed Feb. 24, 1995, now U.S. Pat. No. 5,486,923, which was a continuation of U.S. patent application Ser. No. 08/250,666, filed May 24, 1994, now abandoned, which was a continuation-in-part of U.S. patent application Ser. No. 07/878,494, filed May 5, 1992, now abandoned. Generation of the gate pulse in the subject invention is similar to the generation of the index pulse itself in the above referenced U.S. Pat. No. 5,486,923. However, in the present invention the resolution required for gating is much less critical than in the case of creating the index pulse itself.

The signals from the detector array 300 are further processed to produce an index signal. Index processing comprises three parts: Gate generation, Index Window generation, and Index Pulse generation.

Figure 4:
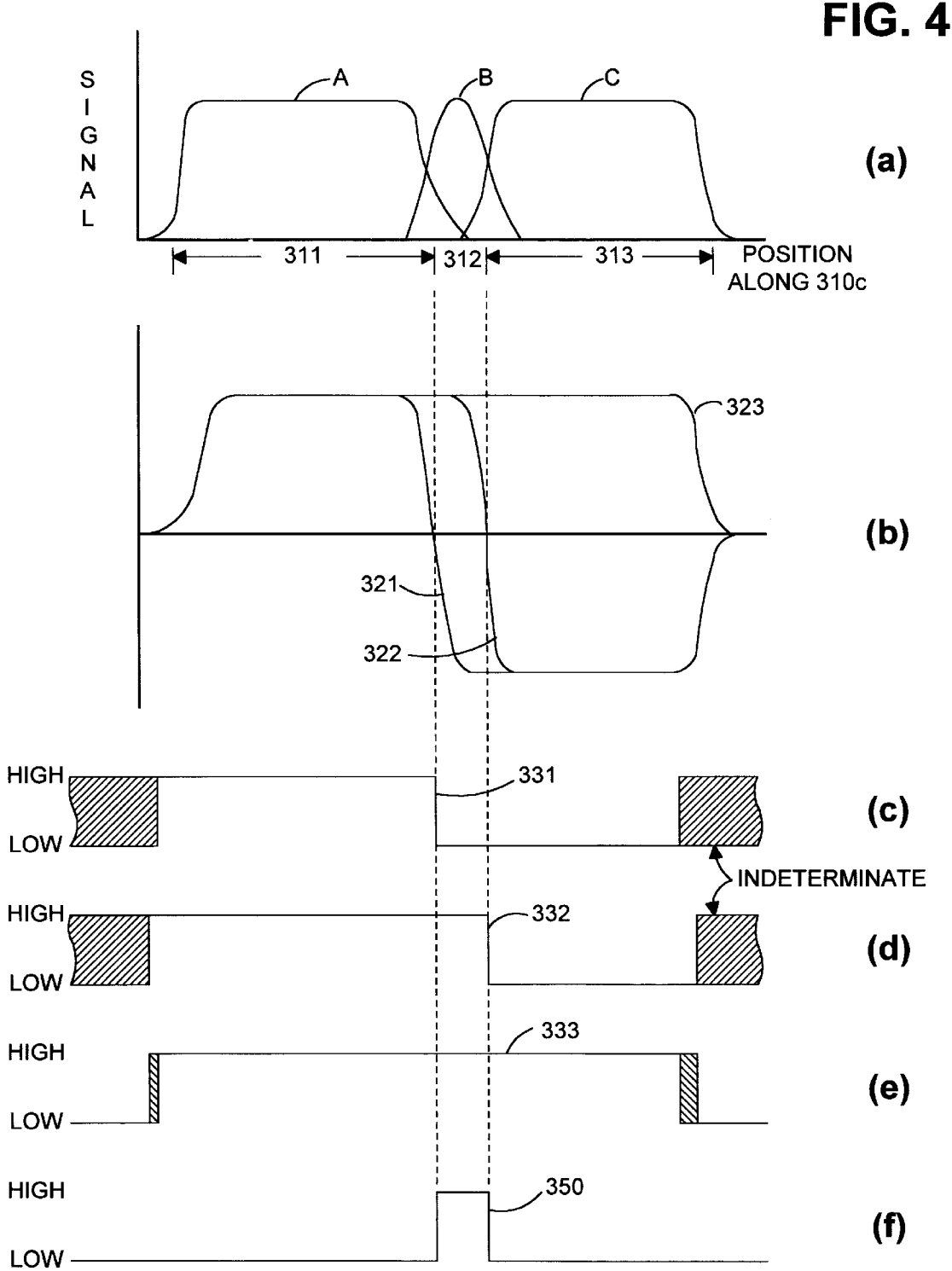
FIGS. 4(a) through 4(f) illustrate how the waveforms from the gate track detector array are employed to generate the gate pulse in accordance with the present invention

As shown in FIG. 4, the gate pulse is created by using the two virtual bi-cells in the gate track array 310c to identify when the binary lens spot centroid is between the two central lines of the bicells (or, equivalently, when the centroid is in the central cell of the tri-cell). If the signals from the three detecting cells 311, 312, and 313 are called A, B, and C, respectively, three functions (A−B−C), (A+B−C) and (A+B+C) can be created, identified as 321, 322, and 323 in the figure Thresholding the first two at zero creates edge crossing indication signals 331 and 332, and thresholding the third at some nominal positive value creates a data valid signal 333. The gate pulse 350 is just the exclusive OR of the first two signals 331 and 332, which is then AND'ed with the third signal 333. Note that only one gate pulse 350 is generated along the entire length of the gratings.

Using the same basic detector array, the width of the gate pulse can be adjusted to match different encoder resolutions (i.e., different grating periods). Since the gate width is essentially the width of the "B" region, we can form a larger middle cell by reconnecting the sensing elements in the array. Elements at the inner edges of cells 311 and 313 can be disconnected from those cells and joined electrically to the element(s) which forms cell 312.

Figure 5:
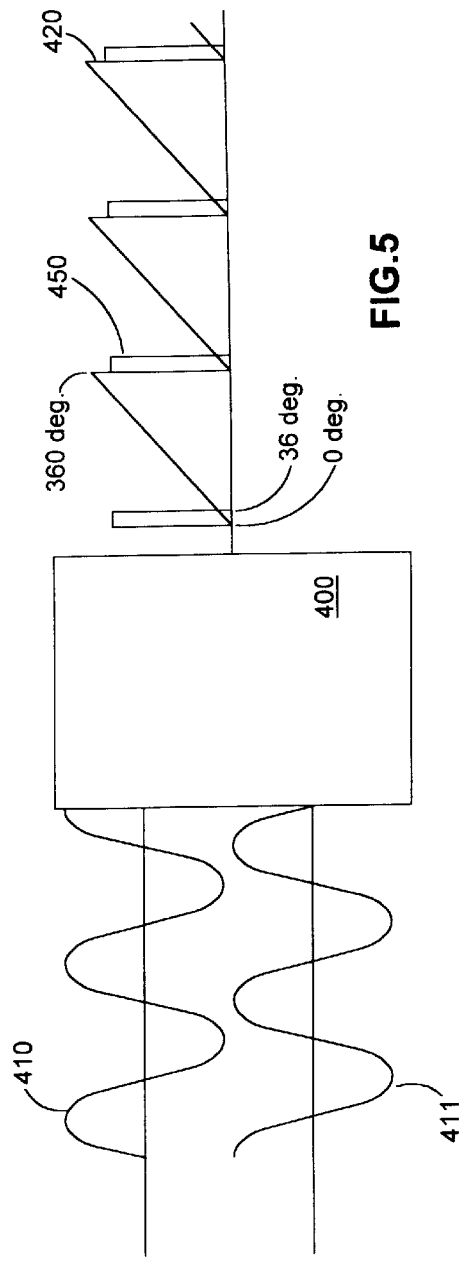
FIG. 5 illustrates the generation of the index window pulse from the signals from the vernier track detector array in accordance with the present invention.

As shown in FIG. 5, the index window pulse(s) 450 are generated by processing the quadrature outputs 410 and 411 of the vernier track 210b in a degenerate interpolator 400. Unlike a full interpolator, a degenerate interpolator is designed to estimate a single phase only. In the figure the full phase 420 of the vernier track 210b is shown for reference along with the interpolator output 450, which stays high between 0 and the design phase value. Thus, the degenerate interpolator 400 produces a once per cycle index window pulse 450 whose width is selected based on the vernier-to-main (VM) track frequency difference and the gate width-to-main track period (GM) ratio. For a 10% VM difference and a GM ratio greater than 1, we select the window width to be approximately 36 degrees (10% of a cycle). For a 10% VM difference and a GM ratio less than 1, we select the window width to be approximately 324 degrees (90% of a cycle). The GM ratio should always be greater than 0.5. An Index Window 450 is created for each cycle on the vernier track 210b.

Figure 6:
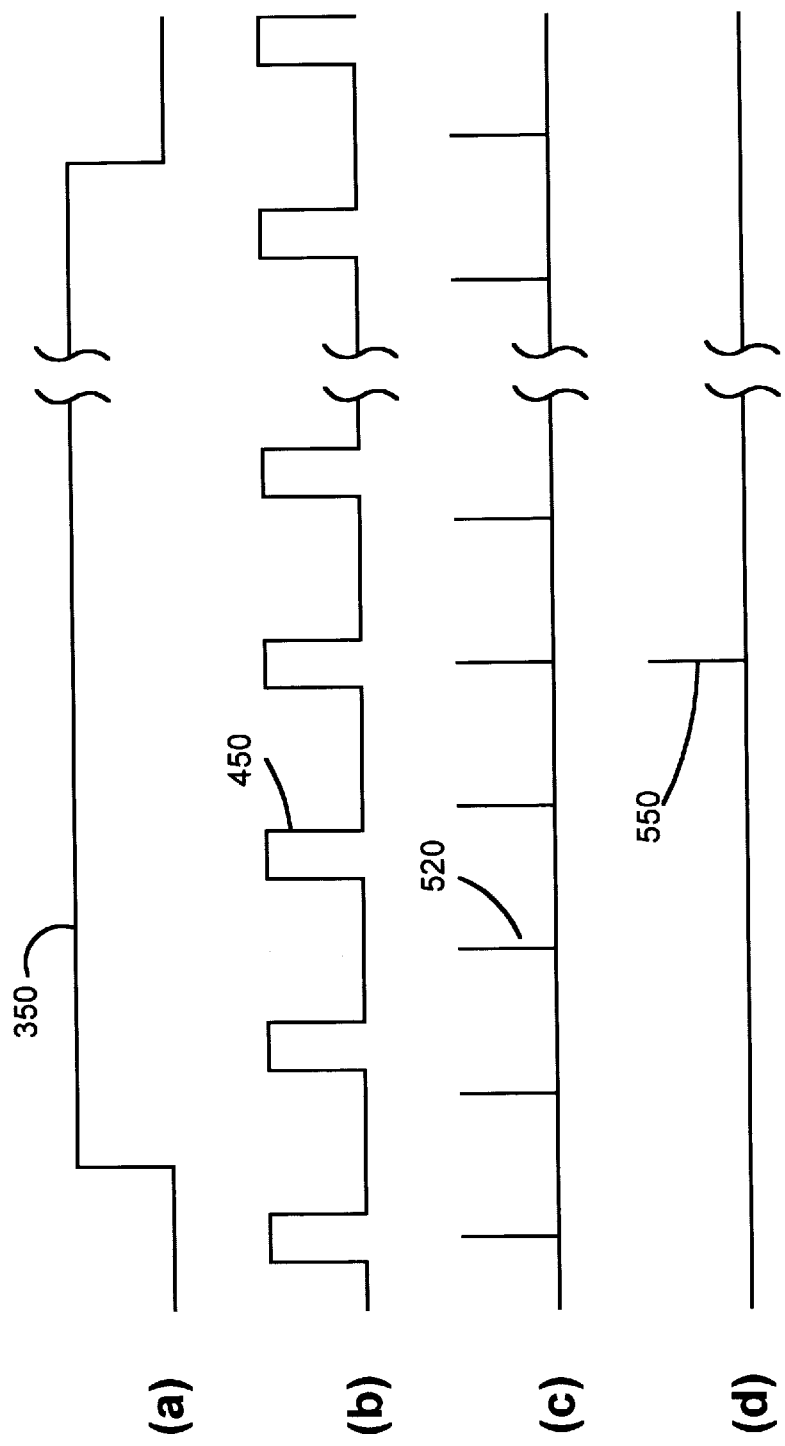
FIGS. 6(a) through (d) illustrate the generation of the index pulse using the gate pulse, FIG. 6(a), the index window pulse, FIG. 6(b), and a signal from the main track, FIG. 6(c), in accordance with the present invention.

As shown in FIG. 6, the actual index pulse 550 is created by ANDing the Gate pulse 350, the Index Window pulse 450, and the Least Significant Bit 520 of a preselected phase of the main track 210a (the main track quadrature signals having been processed by a conventional interpolator). Because of the frequency difference between the main and vernier tracks, 210a and 210b, the preselected phase will only coincide with the Index Window 450 every "nth" cycle (n being approximately equal to the inverse of the percentage frequency difference). Thus, for the example given above of a 10% VM, the index gate pulse width can be less than 1/0.1 cycles wide, for example 9 cycles wide.

Preferably, the width of the index gate pulse 350 is intentionally limited to ensure that there are never two index pulses. By implementing this limit, the possibility is created that the index point will fall just outside the gate. However, by making the "preselected phase" adjustable, at least to the extent of a 180 degree phase shift, these "just missed" index pulses can always be brought back inside the gate. This adjustment only needs to be performed once each time the encoder is installed.

The index pulse 550 is, of course, generated just once per encoder range.

In the preferred embodiment of the present invention a digital processor is used to generate the index pulse because of the higher precision that can be obtained. It is to be understood, however, that it is the coincidence of phases which is the triggering event in the generation of the index pulse. Therefore, the use of analog or other processing which permits the detection of the coincidence of phases is also within the spirit of the present invention. It is also to be understood that the index pulse need not be defined in terms of the presence of a single phase value of the main track. Therefore, within the spirit of the invention, the index pulse can be generated when there is a coincidence of a prespecified phase range in the index track and a prespecified phase range in the main track.

Figure 7:
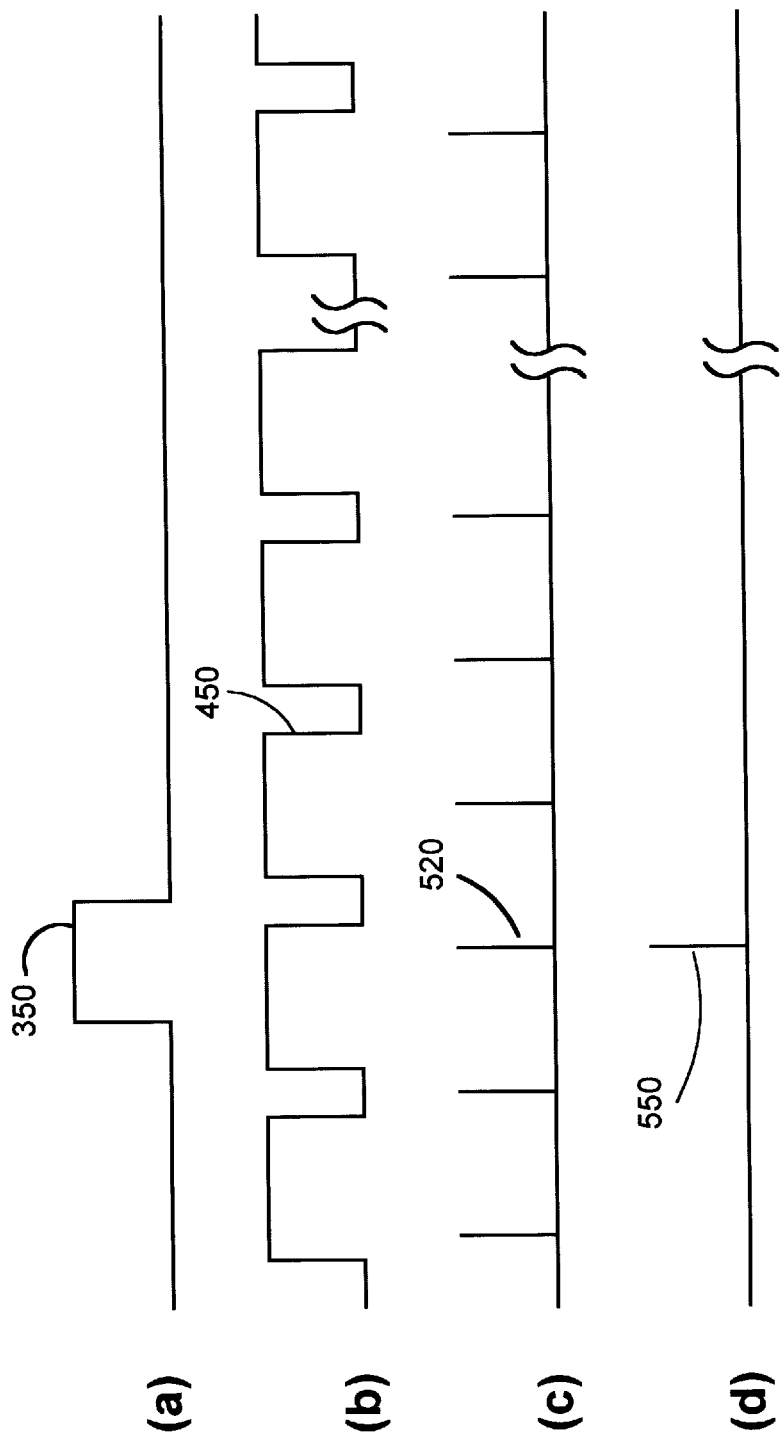
FIGS. 7(a) through (d) illustrate the generation of the index pulse when the gate pulse has a width less than the period of the main track, in accordance with the present invention.

FIGS. 7a through 7d illustrate the generation of the index pulse 550 in accordance with the present invention when the GM ratio is less than 1. Thus, it can be seen from FIG. 7a that the width of gate pulse 350 is less than the period of the main track 210a. The period of main track 210a can be seen in FIG. 7c which depicts the once per cycle Least Significant Bit 520 of the preselected phase of the main track 210a. FIG. 7b illustrates the window 450 created for each cycle of the vernier track 210b, which for the case where the GM ratio is less than 1, is selected to be 100—X percent of a cycle, where X is the percent difference in frequency between the main track 210a and vernier track 210b.

Although the present invention has been described by way of particular examples, it is to be understood that the invention can be implemented in any system which uses a periodic sensing track and which is amenable to a gate track. For example, the invention can be applied to capacitive as well as optical position sensors, and to linear or rotary position sensors.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

What is claimed is:

1. Apparatus for generating an index mark in a position sensor of the type which includes a main diffraction grating having a first frequency, a light source of quasi-monochromatic, spatially collimated light, and a main track detector positioned to detect interference fringes between diffraction orders from a portion of the main diffraction grating which has been positioned to be illuminated by the light source, the apparatus comprising a vernier diffraction grating having a second frequency which is different from the first frequency and which is positioned at a selected location along the main diffraction grating;

a binary optic track having a cylindrical lens function and which is positioned along the vernier diffraction grating;

vernier track and binary optic track detectors positioned adjacent the main track detector so that, upon illumination of the selected location of the main diffraction grating by the light source, interference fringes between diffraction orders from the illuminated portion of the vernier diffraction grating impinge upon the vernier track detector, and a near diffraction limited spot from the binary optic track impinges upon the binary optic track detector; and processing circuitry which generates an index signal when predetermined conditions are present in signals received from the main track, the vernier track, and the binary optics track detectors.

2. The apparatus of claim 1 wherein the processing circuitry includes interpolator circuitry which extracts phase information from the main track detector and the vernier track detector signals, and further wherein the processing circuitry generates the index signal when designated phases in the main track detector and the vernier track detector signals are coincident, and a preselected condition is present in the binary optics track detector signal.

3. The apparatus of claim 2 wherein the designated phase in the main track and/or the vernier track detector signal is a selected range of phases.

4. The apparatus of claim 2 wherein the preselected condition in the binary optics track detector signal is an indication that the near diffraction limited spot has illuminated a predetermined portion of the binary optics track detector.

5. The apparatus of claim 1 wherein the main track detector, the vernier track detector and the binary optics track detectors are multi-segmented detectors.

6. The apparatus of claim 1 wherein the binary optic track detector has multiple regions each of which produces a signal when illuminated.

7. The apparatus of claim 5 wherein the multiple segments of the binary optics track detector are connected in groups to form several detector regions.

8. The apparatus of claim 7 wherein one of the several detector regions is formed from a single segment.

9. The apparatus of claim 7 wherein one of the several detector regions is formed from a number of segments, and further wherein the number of segments is selected as a function of a period of the main track.

10. The apparatus of claim 1 wherein the processing circuitry includes interpolator circuitry which extracts phase information from the main track detector and the vernier track detector signals, and the binary optics track detector provides a gate pulse when the near diffraction limited spot illuminates a designated portion of the binary optics track detector, and further wherein the processing circuitry generates the index signal in the presence of a designated bit pattern in the phase information from the main track detector, phase information from the vernier track detector which falls within a designated range of phases, and the gate pulse from the binary optics track detector.

11. The apparatus of claim 10 wherein the designated bit pattern is the least significant bit only of the phase information from the main track detector, and the designated range of phases for the vernier track detector is 0 degrees to 36 degrees.

12. A method of generating an index track in a position sensor of the type which includes a main diffraction grating having a first frequency, a light source of quasi-monochromatic, spatially collimated light, the method comprising the steps of detecting the phase of interference fringes from a portion of the main diffraction grating which has been positioned to be illuminated by the light source;

detecting the phase of interference fringes from a vernier diffraction grating having a second frequency which is different from the first frequency, and which is positioned at a selected location along the main diffraction grating, when the selected location is illuminated by the light source;

detecting light formed by a binary optic track having a cylindrical lens function and which is positioned along the vernier diffraction grating, when the selected location is illuminated by the light source;

generating an index signal when predetermined phase conditions are present in the interference fringes the main track and the vernier track, and the light formed by the binary optic track satisfies a predetermined condition.

13. Apparatus for generating an index mark in a position sensor of the type which includes a main track which periodically varies along an axis between a first attribute and a second different attribute at an approximate first frequency, and a main track detector which provides signals indicative of the periodic variation of the main track, the apparatus comprising a vernier track which periodically varies along an axis between the first attribute and the second different attribute at an approximate second frequency which is different from the first frequency, and which vernier track is positioned at a selected location along the main track;

a gate track which is positioned along the vernier track and which has a varying selected attribute;

vernier track and gate track detectors positioned along the main track detector so that when the selected location of the main track is positioned to be detected by the main track detector, the vernier and the gate tracks are positioned to be detected by the vernier and gate track detectors, wherein the vernier track detector provides signals indicative of the periodic variation of the vernier track, and the gate track detector provides signals indicative of the variation of the selected attribute of the gate track; and processing circuitry which generates an index signal when predetermined conditions are present in the signals received from the main track, the vernier track, and the gate track detectors.

14. The apparatus of claim 13, wherein the apparatus is an incremental encoder.

15. The apparatus of claim 13, wherein the apparatus is an optical encoder.

16. The apparatus of claim 13, wherein the apparatus is a capacitive encoder.

17. The apparatus of claims 13, 14, 15, or 16, wherein the processing circuitry detects occurrences of a selected condition in the main track variation and in the vernier track variation; and further wherein a difference is chosen between the first frequency at which the main track periodically varies and the second frequency at which the vernier track periodically varies so that the selected condition is detected substantially simultaneously in the main track and the vernier track at least one position along the main track.

18. The apparatus of claim 17, further wherein the variation of the selected attribute of the gate track is chosen so that the variation occurs over a segment of the main track which straddles no more than one position along the main track where the substantially simultaneous occurrence of the selected condition in the main and vernier tracks.

19. The apparatus of claims 13, 14, 15, or 16, wherein the processing circuitry detects the occurrence of a selected phase in the signals from the main track detector, and generates a window having a selected width once for every cycle of the vernier track, and generates the index pulse upon the substantially simultaneous occurrence of the selected phase in the periodic signals from the main track and the gate pulse within a window generated from the vernier track.

20. The apparatus of claim 19, wherein for a difference of X % in the frequency of the vernier track to the main track, the selected width of the window from the vernier track is approximately is X % of a period of the vernier track, and the gate pulse has a width no greater than 100/X cycles.

21. The apparatus of claim 20, wherein X is approximately 10%.

22. The apparatus of claim 21, wherein the width of the window from the vernier track is approximately 10% of a period of the vernier track.

23. The apparatus of claim 22, wherein the gate pulse has a width no greater than ten (10) cycles.

* * * * *